US012703989B2

(12) United States Patent
Austin

(10) Patent No.: US 12,703,989 B2
(45) Date of Patent: Aug. 11, 2026

(54) PORTABLE TRUSS CABLE ROOFING SAFETY APPARATUS AND METHOD

(71) Applicant: Robert A. Austin, Hobe Sound, FL (US)

(72) Inventor: Robert A. Austin, Hobe Sound, FL (US)

( * ) Notice: Subject to any disclaimer, the term of this patent is extended or adjusted under 35 U.S.C. 154(b) by 1210 days.

(21) Appl. No.: 17/506,297

(22) Filed: Oct. 20, 2021

(65) Prior Publication Data

US 2022/0120101 A1 Apr. 21, 2022

Related U.S. Application Data

(60) Provisional application No. 63/094,469, filed on Oct. 21, 2020.

(51) Int. Cl.
*E04G 21/32* (2006.01)
*A62B 35/00* (2006.01)

(52) U.S. Cl.
CPC ...... *E04G 21/3261* (2013.01); *A62B 35/0068* (2013.01)

(58) Field of Classification Search
CPC ............ A62B 35/0043; A62B 35/0056; A62B 35/0068; E04G 21/3214; E04G 21/3261
See application file for complete search history.

(56) References Cited

U.S. PATENT DOCUMENTS 3,237,717 A 3/1966 Jackson
5,664,391 A * 9/1997 Bartholomew ..... E04G 21/3261 248/237
5,718,305 A * 2/1998 Palmer ................ E04G 21/3261 182/45
5,730,246 A 3/1998 Beard
5,842,685 A 12/1998 Purvis et al.
6,412,598 B1 7/2002 Mackinnon
6,446,408 B1 9/2002 Gordin et al.
6,695,095 B1 2/2004 Franke
6,779,630 B2 8/2004 Choate
7,380,373 B2 6/2008 Crookston
(Continued)

FOREIGN PATENT DOCUMENTS

EP 3260629 A1 * 12/2017 ......... A62B 35/0056
GB 2413821 A * 11/2005 ......... E04G 21/3261

OTHER PUBLICATIONS

International Search Report and Written Opinion for International Application No. PCT/US2021/055944 dated Feb. 3, 2022.

*Primary Examiner* — David E Martinez
(74) *Attorney, Agent, or Firm* — Young Basile Hanlon & MacFarlane, P.C.

(57) ABSTRACT

A portable truss cable roofing safety apparatus and method to assist users while working on the roof of a building structure. The portable apparatus provides a pair of similar opposing vertical trusses mounted adjacent opposite sides of the building structure. At least one brace is adaptable for securing each of the pair of vertical trusses to the building structure. A cable is connected to and extends between the pair of vertical trusses. An automatic belay device slidably is connected to the cable and has a safety line connected thereto, wherein the automatic belay device adjusts a length of the safety line to assist the user when the user is connected to the safety line.

15 Claims, 5 Drawing Sheets

(56) References Cited

U.S. PATENT DOCUMENTS

| | | | | |
|---|---|---|---|---|
| 7,802,773 | B2 | 9/2010 | Murphy | |
| 7,828,116 | B2 | 11/2010 | Vetesnik | |
| 8,459,409 | B2 * | 6/2013 | Wiser | A62B 35/0068 182/113 |
| 9,598,875 | B1 | 3/2017 | Bateman et al. | |
| 9,616,255 | B1 | 4/2017 | Liddle | |
| 9,670,685 | B2 | 6/2017 | Landry | |
| 10,463,895 | B2 | 11/2019 | Palet | |
| 2006/0289233 | A1 | 12/2006 | Flaherty | |
| 2010/0012427 | A1 | 1/2010 | Julliard | |
| 2010/0326329 | A1 * | 12/2010 | Kiekhaefer | A47B 13/081 108/25 |
| 2013/0062145 | A1 | 3/2013 | Inoue et al. | |
| 2019/0368211 | A1 * | 12/2019 | Stephan | E04G 21/3276 |
| 2021/0283436 | A1 * | 9/2021 | Arena | A62B 35/005 |

* cited by examiner

PORTABLE TRUSS CABLE ROOFING SAFETY APPARATUS AND METHOD

TECHNICAL FIELD

The present disclosure relates generally to roofing safety systems, and more particularly, a portable truss cable roofing safety apparatus and method that assists workers who are involved in working on the roof of a building structure.

BACKGROUND

Various local, state, and/or federal regulations may require employers to provide safety equipment for employees working on a job site. For example, safety equipment to help prevent employees from injuring themselves may be required in the roofing industry. However, known safety systems are often cumbersome and can create hazardous obstacles that employees must navigate while using the safety system. Further complicating matters is the temporary nature of roofing projects. Job sites frequently change with each job site presenting a new set of construction and safety issues. Therefore, a need exists for a roofing safety system that is portable and minimizes the obstacles created by the safety system while adequately assisting workers at an elevated height.

SUMMARY

The present disclosure provides a portable truss cable roofing safety apparatus to assist a user working on a building structure. The portable truss cable roofing safety apparatus provides a pair of similar opposing vertical trusses mounted adjacent opposite sides of the building structure. At least one brace is adaptable for securing each of the pair of vertical trusses to the building structure. A cable is connected to and extends between the pair of vertical trusses. An automatic belay device is slidably connected to the cable and has a safety line connected thereto, wherein the automatic belay device adjusts a length of the safety line to protect the user when the user is connected to the safety line.

Each of the pair of vertical trusses may have a plurality of sections wherein the plurality of sections may be removed or added to each of the pair of vertical trusses to adjust the vertical height of the vertical trusses. Each of the pair of vertical trusses may have telescopic sections to telescopically adjust the height of the vertical trusses.

At least one lower brace may be adjustably connected to each of the pair of vertical trusses and fixedly connected to a supporting surface. A position ring may be adjustably positioned on each of the pair of vertical trusses and pivotally connected to the at least one lower brace to adjustably position the at least one lower brace on each of the pair of vertical trusses.

At least one horizontal brace may be adjustably connected to each of the pair of vertical trusses and pivotally connected to the building structure. A position ring may be adjustably positioned on each of the pair of vertical trusses and pivotally connected to the at least one horizontal brace to adjustably position the at least one horizontal brace on each of the pair of vertical trusses.

At least one upper brace may be adjustably connected to each of the pair of vertical trusses and pivotally connected to the building structure. A position ring may be adjustably positioned on each of the pair of vertical trusses and pivotally connected to the at least one upper brace to adjustably position the at least one upper brace on each of the pair of vertical trusses.

A weighted container may be connected to a lower end of each of the pair of vertical trusses and secured to a supporting surface.

Each of the pair of vertical trusses may incorporate a ladder for allowing the user to ascend and descend each of the pair of vertical trusses.

The present disclosure also provides a portable truss cable roofing safety method for assisting a user working on a building structure. The method includes assembling at least two vertical trusses adjacent opposite sides of the building structure, wherein heights of the vertical trusses are selected so that the vertical trusses are higher than the building structure; mounting at least one brace to each of the pair of vertical trusses, the building structure, and a supporting surface; suspending a cable over the roof of the structure, wherein the cable is connected to each of the pair of the vertical trusses; and slidably mounting an automatic belay device on the cable, wherein the automatic belay device adjusts a safety line to remain taut to assist the user working on the building structure.

The portable truss cable roofing safety method may include the steps of adjusting the height of the pair of vertical trusses by adding and removing sections of the pair of vertical trusses and adjusting the height of the pair of vertical trusses by telescopically adjusting the pair of vertical trusses.

The portable truss cable roofing safety method may also include adjusting the position of the at least one brace on each of the pair of vertical trusses by sliding a position ring pivotally connected to the at least one brace and adjustably connected to each pair of the vertical trusses.

The portable truss cable roofing safety method may include pivotally connecting the at least one brace to the building structure.

The portable truss cable roofing safety method may include connecting a weighted container to a lower end of each of the pair of vertical trusses and securing the weighted container to a supporting surface.

The portable truss cable roofing safety method may include incorporating a ladder into each of the pair of vertical trusses to allow the user to ascend and descend each of the pair of vertical trusses.

BRIEF DESCRIPTION OF THE DRAWINGS

The invention is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
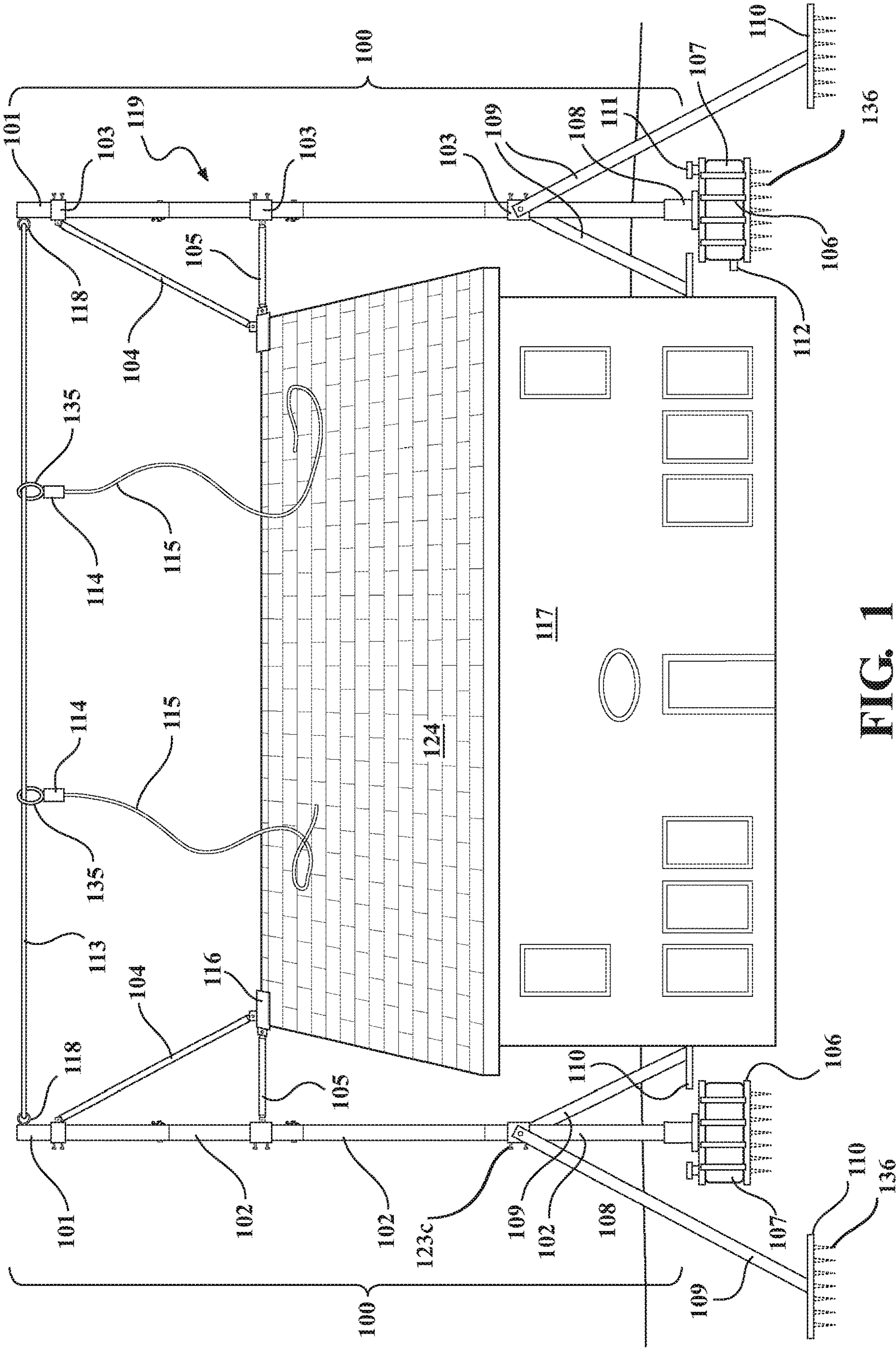
FIG. 1 is a front view of a first embodiment of a portable truss cable safety system assembled adjacent to a two-story house.

The present disclosure provides a portable truss cable roofing safety apparatus and method that secures and assists workers who are involved in working on the roof of a building or building structure. As seen in FIGS. 1-6, a portable truss cable roofing safety system 119 is assembled adjacent to a building structure 117, wherein in a non-limiting example, the building structure 117 may be a two-story house. However, it is intended that the safety system 119 could be used with other vertical structures, including but not limited to, one-story houses, cell towers, billboards, commercial buildings, etc. The safety system 119 is comprised of two or more vertical trusses 100 assembled on opposing or opposite sides of the building structure 117 with a cable 113 connected to and extending between the vertical trusses 100. Workers or users (not shown) wearing harnesses (not shown) are secured to the cable 113 using automatic belay devices 114 and safety lines 115 connected thereto. The automatic belay devices 114 are configured for movement along the cable 113 and to keep the safety lines 115 taut, which allows workers to safely install, replace, or work on a roof 124 of the building structure 117. The safety system 119 itself does not create hazardous obstacles that the worker must avoid because the vertical trusses 100 are spaced a distance from the building structure 117, and the cable 113 is suspended above both the worker and the building structure 117. The portable truss cable roofing safety system 119 is also designed to be quickly assembled and disassembled for easy transportation to and utilization at different worksites.

To provide portability to the safety system 119, the vertical trusses 100 may include multiple components that can be assembled and disassembled as needed. Alternatively, the vertical trusses 100 may be collapsible or telescopic. In the illustrated, non-limiting example, each vertical truss 100 is comprised of multiple hollow cylindrical sections 102, which allows the overall height of the vertical truss 100 to be adjusted and selected based on the height of the building structure 117. For example, three sections 102*a*, 102*b*, 102*c* are utilized in the illustrations in order to extend above the roof 124 of the building structure 117, however, more or less sections 102 may be required, depending on the size of the building structure 117 and the length of the sections 102.

The sections 102 are rigid and can be fabricated from any suitable high-strength material, such as metal. In the illustrated, non-limiting example, the sections 102 are fabricated from aluminum. The length of the sections 102 can be similar or vary depending on the implementation. For example, varying the lengths of the sections 102 would further enhance the ability to customize the overall height of the vertical truss 100 based on the height of the building structure 117. The cross-sectional configuration of the sections 102 can be similar or different depending on what configuration is utilized to assist with assembling the vertical trusses 100. As shown, the sections 102 are cylindrical and have a circular cross-sectional configuration with generally the same diameter.

Figure 6:
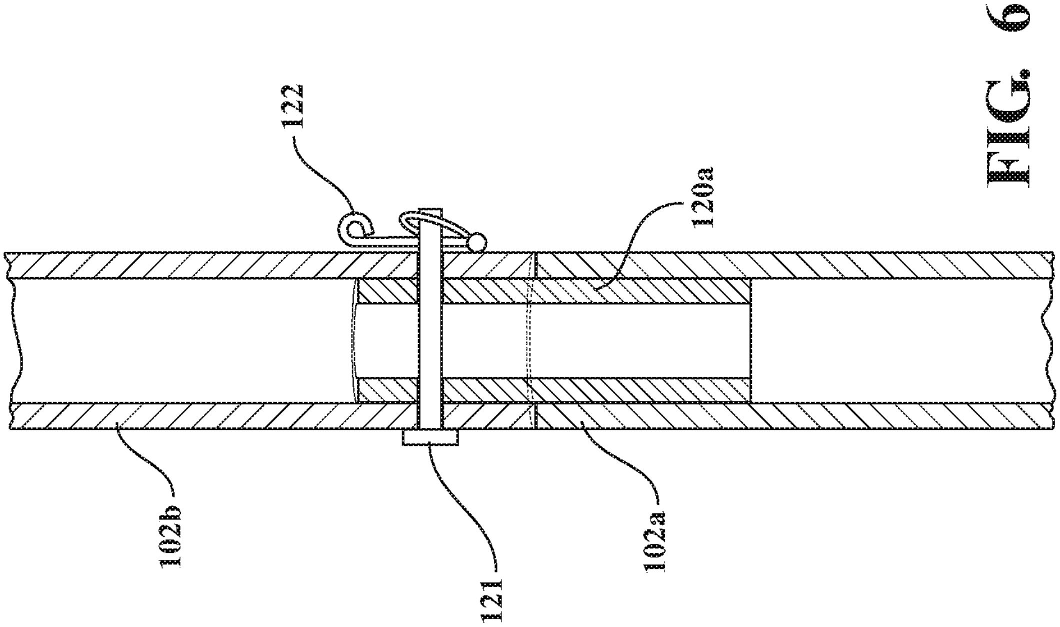
FIG. 6 is a cross-sectional view of a lower connection of the sections of the vertical truss of the portable truss cable safety system.

To assist with connecting the sections 102 to one another to form the vertical trusses 100, the first section 102*a* of the vertical truss 100 extends upward from a supporting surface and may have a first inner cylindrical sleeve 120*a* that is received by and mounted within the upper end of the first section 102*a*. The first inner sleeve 120*a* is smaller in diameter than the diameter of the first section 102*a* and is connected to the inner diameter of the first section 102*a* via welding or friction fit. The inner sleeve 120*a* is received by a lower end of a second section 102*b* of the vertical truss 100 to provide a male to female connection between the first inner sleeve 120*a* and the second section 102*b* of the vertical truss 100 such that the upper end of the first section 102*a* and the lower end of the second section 102*b* abut one another, as seen in FIG. 6. The first inner sleeve 120*a* and the lower end of the second section 102*b* of the vertical truss 100 have correspondingly aligned apertures (not shown) that extend through the lower end of the second section 102*b* and the first inner sleeve 120*a*. A pin 121 is inserted through the apertures, and a safety lock pin 122 is inserted through an aperture (not shown) in the end of the pin 121 to secure the pin 121 in place and maintain the connection between the first section 102*a* and the second section 102*b* of the vertical truss 100.

Figure 3:
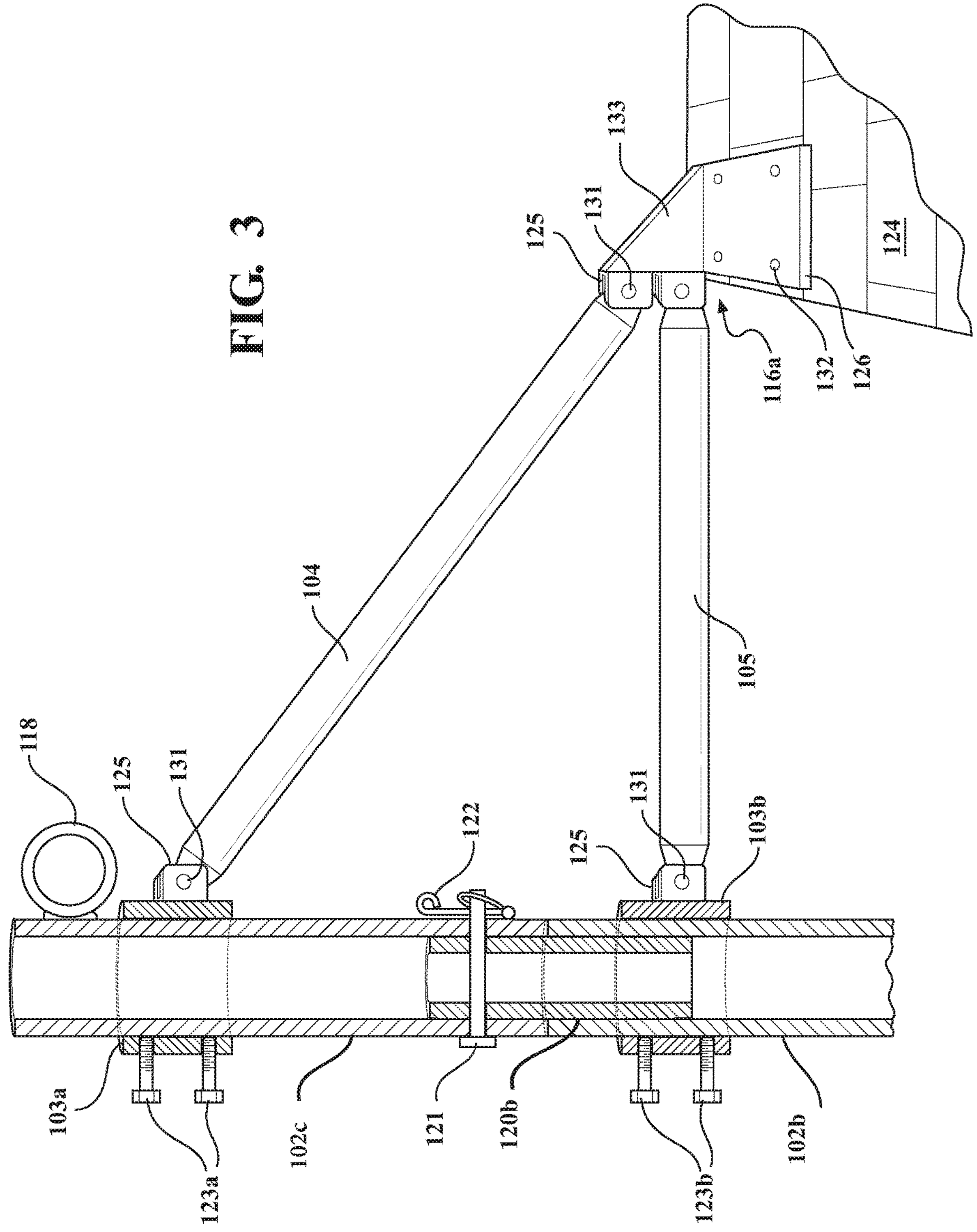
FIG. 3 is a cross-sectional view of an upper connection of the sections of a vertical truss of the portable truss cable safety system.

A similar configuration is shown in FIG. 3, wherein an upper end of the second section 102*b* of the vertical truss 100 has a second inner sleeve 120*b* that is received by and extends from the upper end of the second section 102*b*. The second inner sleeve 120*b* is connected to the upper end of the second section 102b via weld or friction fit. The second inner sleeve 120*b* is smaller in diameter than a third section 102*c* of the vertical truss 100, such that a lower end of third section 102*c* receives the inner sleeve 120*b* in a male to female connection, wherein the upper end of the second section 102*b* and the lower end of the third section 102*c* of the vertical truss 100 abut one another. The second inner sleeve 120*b* and the lower end of the third section 102*c* of the vertical truss 100 may have aligning apertures (not shown) that extend through the second inner sleeve 120*b* and the lower end of the third section 102*c*. Another pin 121 extends through the apertures in the second inner sleeve 120*b* and the lower end of the third section 102*c* of the vertical truss, and a safety lock pin 122 is inserted through an aperture (not shown) in the end of the pin 121 to secure the pin 121 in place and releasably connect the second section 102*b* to the third section 102*c* of the vertical truss 100. Alternatively, sections 102 of the vertical truss 100 may be smaller in diameter than the adjacent section 102 so that the sections 102 of the vertical truss 100 may receive one another telescopically.

Figure 2:
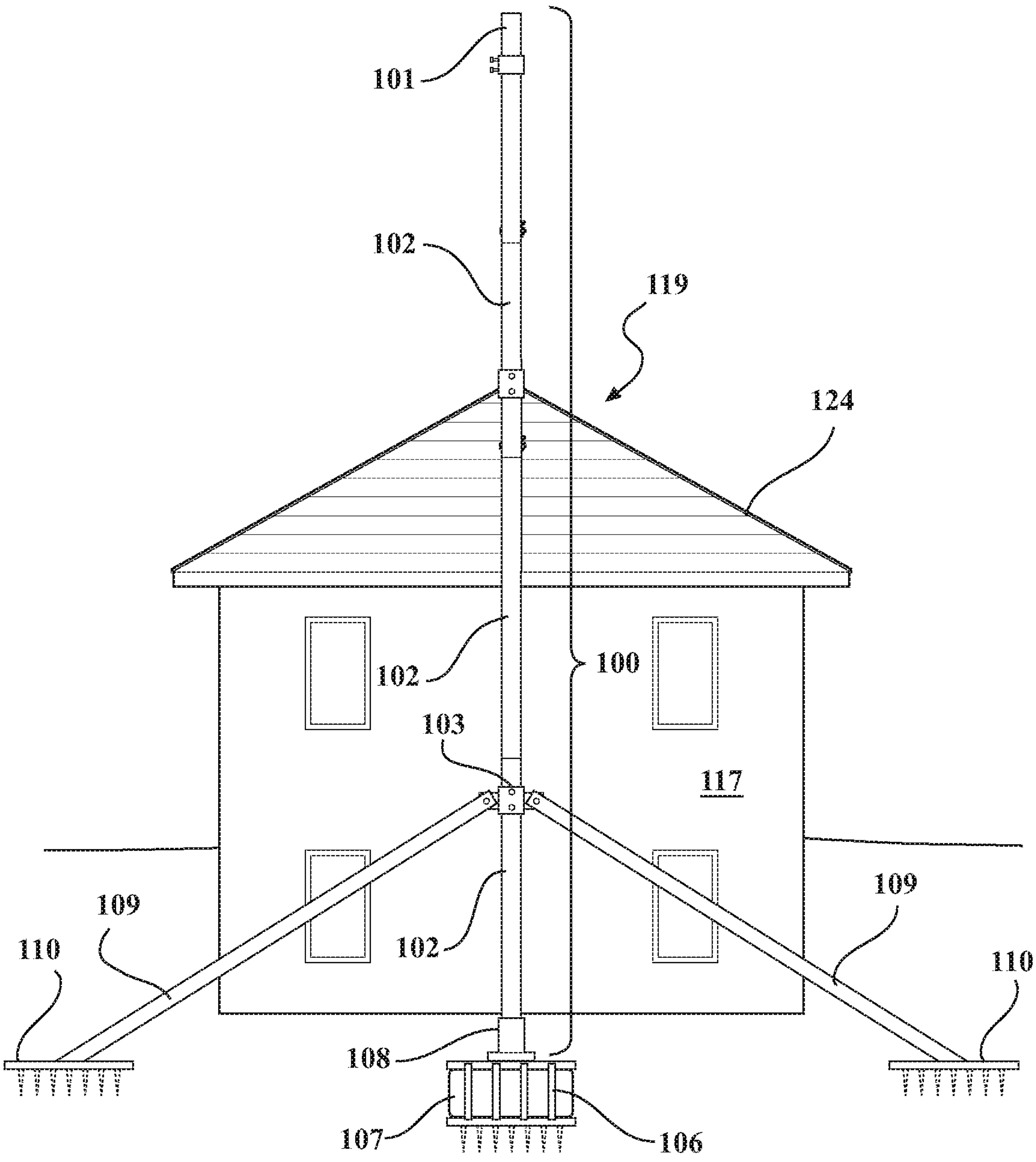
FIG. 2 is a side view of the first embodiment of the portable truss cable safety system.
Figure 5:
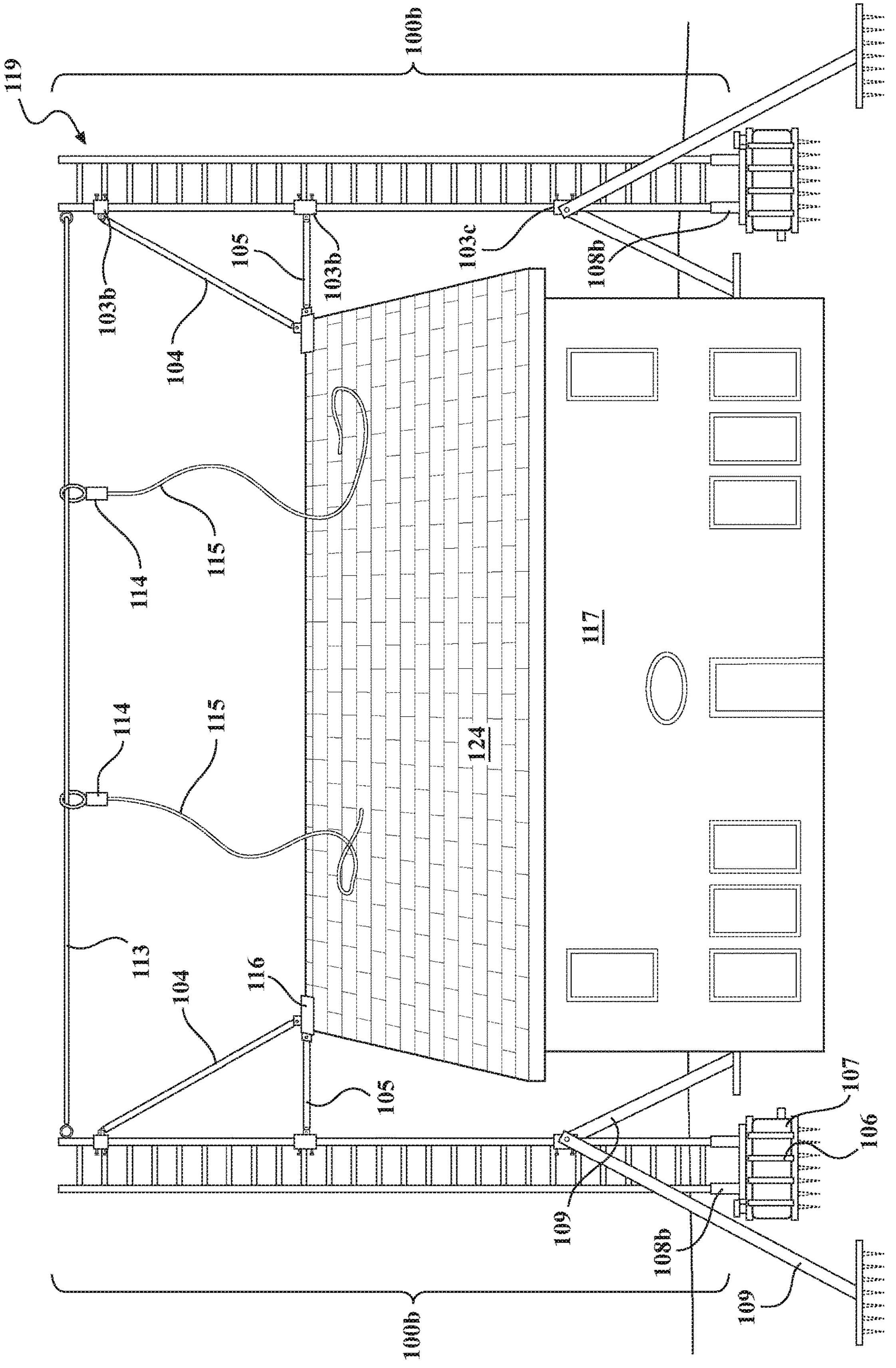
FIG. 5 is a front view of a second embodiment of the portable truss cable safety system assembled adjacent to the two-story house.

To assist in supporting the vertical truss 100 in an upright position, a bottom end of the first section 102*a* of the vertical truss 100 can be secured to a truss base 108 extending upwards from a base cage 106, as seen in FIGS. 1-2 and 5. The truss base 108 and the base cage 106 can be fabricated from any suitable material, such as metal or plastic. The truss base 108 can be attached to the base cage 106 by any known means, such as fasteners or welds. An upper portion of the truss base 108 may have a cylindrical configuration for matingly receiving the lower end of the first section 102*a* of the vertical truss 100. The lower end of the first section 102*a* of the vertical truss 100 may be secured within the upper portion of the truss base 108 by any known means, such as an interference fit or conventional fasteners.

To help minimize unwanted movement of the base cage 106 and the vertical truss 100, a bottom of the base cage 106 can be provided with spikes 136 or a non-skid material. The spikes 136 or non-skid material can be disposed on an interchangeable plate (not shown), which would allow for the base cage 106 to be altered based on the environment adjacent to the building structure 117. For example, it may be desirable to use the non-skid material when the base cage 106 is placed on a hard supporting surface, such as concrete, blacktop, rock, or other similar materials, adjacent to the building structure 117. Alternatively, it may be desirable to use the spikes 136 on the base cage 106 when the base cage 106 is placed on grass, dirt, sand, or other softer supporting surfaces adjacent the building structure 117.

To further stabilize the vertical truss 100, the base cage 106 may house a container 107 having a fill port 111 and an evacuation port 112, which can be used to fill and empty the container 107 with a liquid or other viscous material, such as water or sand. The container 107 can be fabricated from any suitable material, such as plastic. The size of the base cage 106 and the container 107 can vary depending on the needs of the implementation. For example, it may be desirable to increase the size of the base cage 106 and/or the container 107 for taller structures 117 and/or when larger loads are anticipated such that the weight of the base cage 106 can be increased. A 13 cubic ft container 107 would weigh approximately 1,800 lbs. if the container 107 was fully filled with water.

In addition to the base cage 106, the vertical trusses 100 can also be secured in an upright position through the use of braces, such as upper braces 104, horizontal braces 105, and/or lower lateral braces 109, as seen in FIGS. 1-5. The upper braces 104, the horizontal braces 105, and the lower lateral braces 109 can be fabricated from any suitable high-strength, light weight material, such as metal or plastic, and are pivotally connected to the vertical truss 100 via positioning rings 103. In a nonlimiting disclosure, each vertical truss 100 utilizes one upper brace 104, one horizontal brace 105, and two lower lateral braces 109. The upper brace 104 can extend at a downward angle from the third section 102*c* of the vertical truss 100 to the roof 124 of the building structure 117. The horizontal braces 105 can extend laterally from the second section 102*b* of the vertical truss 100 to the roof 124 of the building structure 117. The lower lateral braces 109 can extend at a downward angle from the first section 102*a* of the vertical trusses 100 to the supporting surface, such as the ground. The lengths of the upper braces 104, the horizontal braces 105, and the lower lateral braces 109 can vary depending on the implementation. In the illustrated, non-limiting example, the lower lateral braces 109 are the longest of the three braces 104, 105, 109, and the horizontal braces 105 are the shortest of the three braces 104, 105, 109. To provide additional stability, each lower lateral brace 109 can have a cleated base 110 or non-skid material (not shown) on the end opposite the vertical trusses 100 for engaging the supporting surface.

To allow for a sliding adjustment of the positioning rings 103 relative to the vertical trusses 100, the positioning rings 103 may have a cylindrical configuration that overlaps and receives the cylindrical configuration of the sections 102 of the vertical truss 100. Each positioning ring 103 is pivotally connected to one of the braces 104, 105, 109 to provide pivotal adjustment of the braces 104, 105, 109 related to the vertical truss 100. For instance, a first positioning ring 103*a* is pivotally connected to the upper brace 104, a second positioning ring 103*b* is pivotally connected to the horizontal brace 105, and a third positioning ring 103*c* is pivotally connected to the lower lateral braces 109. Each positioning ring 103*a*, 103*b*, 103*c* may be secured to the vertical truss 100 through of a pair of bolts 123*a*, 123*b*, 123*c*, respectively, that are received by threaded apertures (not shown) provided in the positioning rings 103*a*, 103*b*, 103*c*. The bolts 123 may be driven into the sections 102 of the vertical truss 100 to secure the positioning ring 103 in a set position. To readjust the position of the position rings 103 and set the position of the braces 104, 105, 109, the bolts 123 may be loosened from the vertical truss 100 to allow the position rings 103 to slide along the sections 102 of the vertical truss 100. The positioning rings 103 can include one or more flanges 125 that extend outwardly from each of the positioning rings 103. Each flange 125 has opposing side members that have aligned apertures (not shown) extending through both of the opposing side members. Each of the attached braces (i.e., the upper braces 104, the horizontal braces 105, and the lower lateral braces 109) have an end with an aperture (not shown) extending therethrough, wherein the end of the brace 104, 105, 109 is placed between the opposing side members of the flange 125 such that the aperture in the end of the brace 104, 105, 109 aligns with the aperture in the flange 125. A pivot pin 131 extends through the apertures in the flange 125 and the brace 104, 105, 109 to hingedly or pivotally attach the positioning ring 103 to each of the braces 104, 105, 109.

To assemble the safety system 119 to the adjacent structure 117, mounting plates 116*a* can be used to temporarily secure the vertical trusses 100 to the building structure 117. In the illustrated, non-limiting example shown in FIG. 3, the mounting plate 116*a* includes a mounting surface portion 126 that is temporarily secured to the roof 124 of the building structure 117 using traditional fasteners 132, such as screws or nails. A triangular bracket portion 133 is integral with and extends upwardly from the mounting surface portion 126 of the mounting plate 116*a*. Two of the flanges 125 extend from the triangular bracket portion 133 to pivotally connect one of the upper braces 104 and one of the horizontal braces 105 to the mounting plate 116*a* through the use of the pivot pins 131 extending through correspondingly aligned apertures (not shown) in the flanges 125 and the upper and horizontal braces 104, 105, respectively, as previously described.

To suspend the cable 13 between the opposing vertical trusses 100, cable mounting rings 118 are connected to a top portion 101 of the third section 102*c* of the vertical trusses 100. One or more of the automatic belay devices 114 are coupled to the cable 113 through the use of a sliding ring 135 such that the automatic belay devices 114 can move freely along the cable 113 between the vertical trusses 100, as shown in the illustrated, non-limiting example of FIGS. 1 and 5. The automatic belay devices 114 automatically adjust the length of the safety lines 115 so that the safety line 115 remains taut whenever the elevation or positioning of the worker harnessed to the automatic belay device 114 changes. By keeping the safety lines 115 taut, the worker can safely work on the roof 124 of the building structure 117.

As needed, the safety system 119 is assembled by positioning the base cage 106 adjacent to the building structure 117 and filling the container 107 with water or sand. The vertical trusses 100 are assembled using the number of sections 102 necessary to achieve the desired height of each vertical truss 100. Once the sections 102 are connected and the vertical trusses 100 are upright, the mounting plates 116 may be mounted to the roof 124 of the building structure 117. The positioning rings 103 may be vertically positioned and secured along the vertical trusses 100 while being pivotally connected to the upper braces 104 and the horizontal braces 105. The lower lateral braces 109 are positioned on the supporting surface so that the lower lateral braces 109 form an approximately 45-degree angle between each lateral brace 109 and the vertical truss 100. This can be achieved by varying the vertical placement of the positioning ring 103 that is connected to the lower lateral braces 109 along the vertical truss 100. The cable 113 is then attached to the cable mounting rings 118 at the top portion 101 of the vertical trusses 100 so that the cable 113 is taut and suspended above the roof 124 of the building structure 117. The automatic belay devices 114 are slidably attached to the cable 113 through the use of the sliding rings 135, and the workers are then attached to the safety lines 115 of the automatic belay devices 114 using harnesses. Once the work is completed on the structure 117, the safety system 119 can be disassembled in the reverse manner, transported to a different structure, and reassembled adjacent the next building structure.

Figure 4:
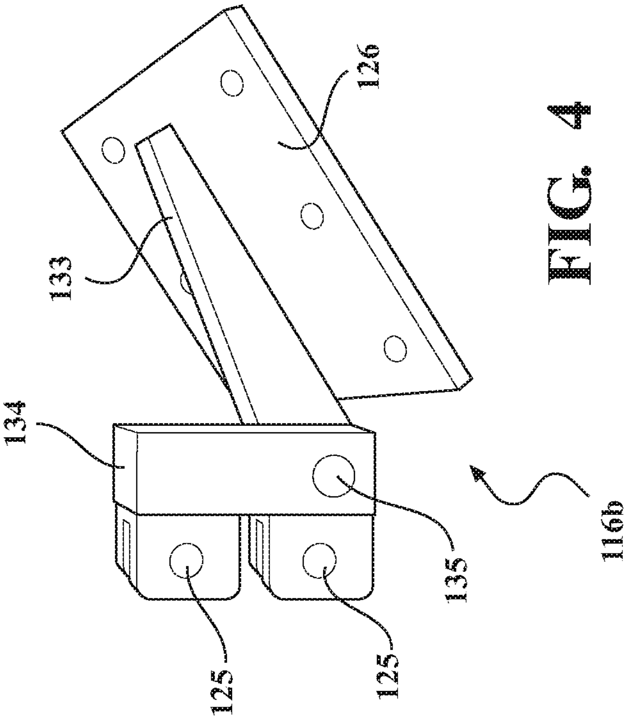
FIG. 4 is a perspective view of an alternative embodiment of a mounting plate.

Alternative implementations of the safety system 119 are disclosed in FIGS. 4-5. All aspects of the safety system 119 remain the same except as indicated. In FIG. 4, an alternative implementation of the mounting plate 116*b* is shown. In this implementation, the flanges 125 that connect to the upper braces 104 and the horizontal braces 105 are connected to a base 134 which is pivotally or hingedly connected to the triangular bracket portion 133 through a pivot pin 135 which extends through an aperture (not shown) in the triangular bracket portion 133. The triangular bracket portion 133 extends integrally and upwardly from the center of the mounting surface portion 126 of the mounting plate 116*b*. The pivotal connection of the base 134 to the triangular bracket portion 133 allows the flanges 125 and the braces 104, 105 to pivot with respect to the mounting surface portion 126 of the mounting plate 116*b*. Thus, the mounting plate 116*b* can be mounted at an angle on the roof 124 of the building structure 117, such as when the mounting plate 116*b* is attached to a hip roof (not shown).

FIG. 5 shows another alternative implementation of the safety system 119, wherein the vertical trusses 100 may be replaced with heavy-duty commercial grade extension ladders 100B to allow the workers easy access to the positioning rings 103 and the roof 124 of the building structure 117. To accommodate the extension ladders 100B, the base cages 106 are provided with two truss bases 108*b* to receive and engage both legs of the extension ladder 100B. The positioning rings 103 and the braces 104, 105, 109 connect to the extension ladders 100B in the same manner as described for the vertical trusses 100. Alternatively, the extension ladders 100B may be incorporated into one or more of the vertical trusses 100.

While the invention has been described in connection with certain embodiments, it is to be understood that the invention is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A portable truss cable roofing safety apparatus to assist a user working on a building structure having a roof, the apparatus comprising:
- a pair of opposing vertical trusses mounted adjacent and spaced from opposite sides of the building structure;
- at least one brace adaptably secured to the roof with fasteners for adjustably securing each one of the pair of opposing vertical trusses to the building structure;
- a cable connected to and extending between the pair of opposing vertical trusses; and
- an automatic belay device slidably connected to the cable and having a safety line connected thereto, wherein the automatic belay device is configured to adjust a length of the safety line when the user is connected with the safety line;
- the at least one brace having at least one horizontal brace adjustably connected to each one of the pair of opposing vertical trusses and pivotally connected to the roof of the building structure; and
- a cylindrical position ring that overlaps and receives each one of the pair of opposing vertical trusses to slidably adjust the cylindrical position ring on each one of the pair of opposing vertical trusses and pivotally connect the cylindrical position ring to the at least one horizontal brace to adjustably position the at least one horizontal brace on each one of the pair of opposing vertical trusses.

2. The portable truss cable roofing safety apparatus stated in claim 1, further comprising:
- each one of the pair of opposing vertical trusses having a plurality of sections wherein the plurality of sections are connected to adjust a vertical height of each one of the pair of opposing vertical trusses, wherein the plurality of sections are connected to one another by an inner sleeve.

3. The portable truss cable roofing safety apparatus stated in claim 1, further comprising:
- each one of the pair of opposing vertical trusses having telescopic sections to telescopically adjust a vertical height of each one of the pair of opposing vertical trusses.

4. The portable truss cable roofing safety apparatus stated in claim 1, wherein the at least one brace further comprises:
- at least one lower lateral brace adjustably connected to and extending at a downward angle from each one of the pair of opposing vertical trusses for engaging a supporting surface.

5. The portable truss cable roofing safety apparatus stated in claim 4, further comprising:
- a cylindrical position ring that overlaps and receives each one of the pair of opposing vertical trusses to adjustably position the cylindrical position ring on each one of the pair of opposing vertical trusses and pivotally connect the cylindrical position ring to the at least one lower lateral brace to adjustably position the at least one lower lateral brace on each one of the pair of opposing vertical trusses.

6. The portable truss cable roofing safety apparatus stated in claim 1, wherein the at least one brace further comprises:
- at least one upper brace adjustably connected to each one of the pair of opposing vertical trusses and pivotally connected to the roof of the building structure.

7. The portable truss cable roofing safety apparatus stated in claim 6, further comprising:
- a cylindrical position ring that overlaps and receives each one of the pair of opposing vertical trusses to adjustably positioned the cylindrical position ring on each one of the pair of opposing vertical trusses and pivotally connected the cylindrical position ring to the at least one upper brace to adjustably position the at least one upper brace on each one of the pair of opposing vertical trusses.

8. The portable truss cable roofing safety apparatus stated in claim 1, further comprising:
- a weighted container connected to a lower end of each one of the pair of opposing vertical trusses and secured to a supporting surface.

9. The portable truss cable roofing safety apparatus stated in claim 1, wherein each one of the pair of opposing vertical trusses further comprise:
- a ladder for allowing the user easy access to the roof.

10. A portable truss cable roofing safety method for assisting a user working on a roof of a building structure, the method comprising steps of:

assembling at least two vertical trusses adjacent to and spaced from opposite sides of the building structure, wherein heights of the at least two vertical trusses are selected so that the at least two vertical trusses extend above the roof of the building structure;

adjustably mounting at least one brace to each of the at least two vertical trusses, the roof of the building structure, and a supporting surface;

suspending a cable over the roof of the building structure, wherein the cable is connected to each of the at least two vertical trusses; and slidably mounting an automatic belay device on the cable, wherein the automatic belay device adjusts a safety line to remain taut to assist the user working on the roof of the building structure; and adjusting a position of the at least one brace on each of the at least two vertical trusses by sliding a cylindrical position ring over each of the at least two vertical trusses and pivotally connect the cylindrical position ring to the at least one brace.

11. The portable truss cable roofing safety method stated in claim 10, further comprising the steps of:

adjusting the height of the at least two vertical trusses by connecting sections of the at least two vertical trusses, wherein an inner sleeve is provided to connect the sections of the at least two vertical trusses.

12. The portable truss cable roofing safety method stated in claim 10, further comprising the steps of:

adjusting the height of the at least two vertical trusses by telescopically adjusting the at least two vertical trusses.

13. The portable truss cable roofing safety method stated in claim 10, further comprising the steps of:

pivotally connecting the at least one brace to the roof of the building structure.

14. The portable truss cable roofing safety method stated in claim 10, further comprising the steps of:

connecting a weighted container to a lower end of each of the at least two vertical trusses and securing the weighted container to the supporting surface.

15. The portable truss cable roofing safety method stated in claim 10, further comprising the steps of:

incorporating a ladder into each of the at least two vertical trusses to allow the user easy access to the roof.

* * * * *